RECORDING AND REPRODUCING SYSTEM

Filed May 29, 1961 6 Sheets-Sheet 1

DWIGHT D. WILCOX JR.
INVENTOR.

BY Nathan N. Kallman

ATTORNEY

RECORDING AND REPRODUCING SYSTEM

Filed May 29, 1961 6 Sheets-Sheet 2

DWIGHT D. WILCOX JR.
INVENTOR.

BY Nathan N. Kallman

ATTORNEY

RECORDING AND REPRODUCING SYSTEM

DWIGHT D. WILCOX JR.
INVENTOR.

BY Nathan N. Kallman

ATTORNEY

DWIGHT D. WILCOX JR.
INVENTOR.

BY Nathan N. Kallman

ATTORNEY

RECORDING AND REPRODUCING SYSTEM

Filed May 29, 1961 6 Sheets-Sheet 5

DWIGHT D. WILCOX JR.
INVENTOR.

BY Nathan N. Kallman

ATTORNEY

DWIGHT D. WILCOX JR.
INVENTOR.

BY Nathan N. Kallman

ATTORNEY 3,188,615
Patented June 8, 1965

3,188,615

RECORDING AND REPRODUCING SYSTEM

Dwight D. Wilcox, Jr., Los Altos, Calif., assignor to Ampex Corporation, Redwood City, Calif., a corporation of California Filed May 29, 1961, Ser. No. 113,321
9 Claims. (Cl. 340—174.1)

This invention relates to magnetic tape systems, and particularly to the recording and reproduction of information on magnetic tape with precise time base stability and very wide bandwidth capacity.

Magnetic tape systems are predominantly used for recording or reproducing large amounts of data over relatively long periods of time. Although magnetic tape systems may be used so as to provide relatively rapid access to particular data, and may be started and stopped in times of the order of a millisecond or less, their greatest advantages over other data storage systems lies in recording vast amounts of data.

The capabilities of magnetic tape systems in this regard are derived largely from their wide bandwidth capacity, high information density, and the simplicity of the circuitry needed for recording and reproduction. The most sophisticated and demanding applications for these systems are found in television and instrumentation recording. In recording television signals, for example, the system must be able to accept signals over a 4 megacycle (hereinafter mc) band, and provide accurate representations of the various synchronizing and equalizing signals while still maintaining a very precise time base stability. The degree of precision which is required will be appreciated when it is recognized that the horizontal scanning frequency in the composite monochrome television signal is 15,750 lines per second. Comparable precision is required in instrumentation recording, in which rapidly varying data may be received from a great many sources simultaneuosly during the operation of a complex system. Separate measurements may be taken of temperature, pressure, acceleration and strain during the operation of an aircraft, for example, and it may be desired to record these along with voice communications and other data. In order to provide accurate records of rapidly varying transients and other quickly changing phenomena, recording and reproducing systems must have a bandwidth capacity which approaches or equals that of the television recording system. Of equal importance, the time base stability of the system must be held within small fractions of a microsecond and data must be continuous in order for the information to be fully meaningful on reproduction.

Eminently satisfactory results are provided by systems which use a scanning drum including one or more magnetic heads. The most precise of these systems uses a plurality of heads, mounted circumferentially on the scanning drum, with the drum rotating substantially transversely with respect to a relatively wide tape that is driven longitudinally or helically relative to the axis of the drum. Although the heads scan across the tape at high speed, the longitudinal speed of the tape is extremely slow, by comparison.

With such transverse scan or helical drive systems, various timing arrangements are made available by which a timing reference may be recorded on the tape during recording, and this timing reference may then be utilized during reproduction to ensure time base stability, which is at least an order of magnitude better than with other wide band systems. On reproduction, the system switches between the heads as they scan the tape to reconstitute the continuous signal. These systems, which are widely used in television recording, may also be used in instrumentation applications, through multiplexing of a great number of input signals, with subsequent demultiplexing on reproduction.

It will be appreciated that the more compact and less expensive these systems can be while still achieving desired results, the greater will be the number of uses for which they may be employed. It has heretofore been difficult to eliminate the switching transients introduced when switching between the heads in the reproduction mode. Unless the switching transient is eliminated (it can occur during the retrace interval with television signals without introducing serious problems) the reproduced data is not continuous. It has also been difficult, for instrumentation applications, to provide a system which would operate unattended for long periods of time while accepting information at high data rates. As a particular example, telemetered data that is modulated in an FM/FM type of modulation is particularly affected by longitudinal flutter effects in tape movement.

It is therefore an object of the present invention to provide an extremely compact wide band recording system that operates with precise time base stability.

Another object of the present invention is to provide an extremely small and relatively low cost recording and reproducing system having a very wide bandwidth capacity.

A further object of the present invention is to provide an improved and reliable recording and reproducing system in which the recording function may be performed separately with excellent time base stability being achieved on reproduction.

A further object of the present invention is to provide a versatile and compact recording system capable of recording over a relatively long period of time, but requiring relatively little power.

Another object of the present invention is to provide an improved magnetic recording and reproducing system utilizing transverse track or helical path scanning.

A further object of the present invention is to provide improved systems for the precise recording and reproduction of continuous data at high information rates.

Systems in accordance with the present invention achieve these and other objects by the use of a magnetic recording and reproducing system employing a precisely controlled frequency standard. The frequency standard is recorded along with the data and is utilized for both coarse and fine timing controls during subsequent reproduction of the data.

In accordance with one aspect of the present invention, wide band data is recorded by a transverse track system, together with a pilot carrier or sandard frequency signal from a stabilized source at a frequency which is outside the frequency spectrum of the wide band data. Upon reproduction of the signals, the pilot carrier is separated from the data, but is used as a timing reference signal. The timing reference signal is used for servo control of the scanning drum during reproduction, and also for an electronic adjustment which constitutes a vernier time base control. In a specific form of such system, the fine timing adjustment is made prior to final switching by an electronically variable delay line operating in conjunction with phase detectors which are responsive to a frequency standard and to the reproduced pilot carrier. This circuitry is employed in conjunction with means for gradually blending the signals from the individual heads together subsequent to the fine timing adjustment. A time base stability of the order of a relatively few millimicroseconds is achieved, although there is complete interchangeability between different recording and reproducing systems and the reproduction is continuous. Extremely compact portable recording systems thus provided may be employed in mobile and temporary installations, and the information may later be played back when convenient on any of a number of different reproducers.

Another feature of the present invention is the employment of particular electronically variable delay means in achieving fine timing control. In conjunction with the electronically variable delay means, there may be included a pair of servo loops, either closed or open, one of which is arranged to maintain the delay at a proper average operating point, and the second of which is arranged to provide a fine adjustment of the timing to an extremely precise established time base.

In accordance with other aspects of the invention, particular advantages are derived from the manner in which the pilot carrier is used. The data is frequency modulated about a selected center frequency so as to occupy a selected range in the frequency spectrum. A pilot carrier outside this spectrum is then added linearly to the frequency modulated data signals prior to recording. On reproduction the pilot carrier is filtered out from the data and compared to a standard for servo control.

Another aspect of the invention is the interrelationship that is used between the switching and variable delay circuits during the reproduction of signals. Oppositely disposed heads, one active and one inactive, are first coupled together to direct the reproduced signals alternately into two signal channels. Then the fine timing adjustment is made by an electronically variable delay line in each channel. Final combination of the two signals is made by a relatively gradual blending, in which the contribution from one channel is diminished as the contribution from the other channel is increased.

A better understanding of the invention may be had by reference to the following description, taken in conjunction with the accompanying drawings, in which.

Figure 1:
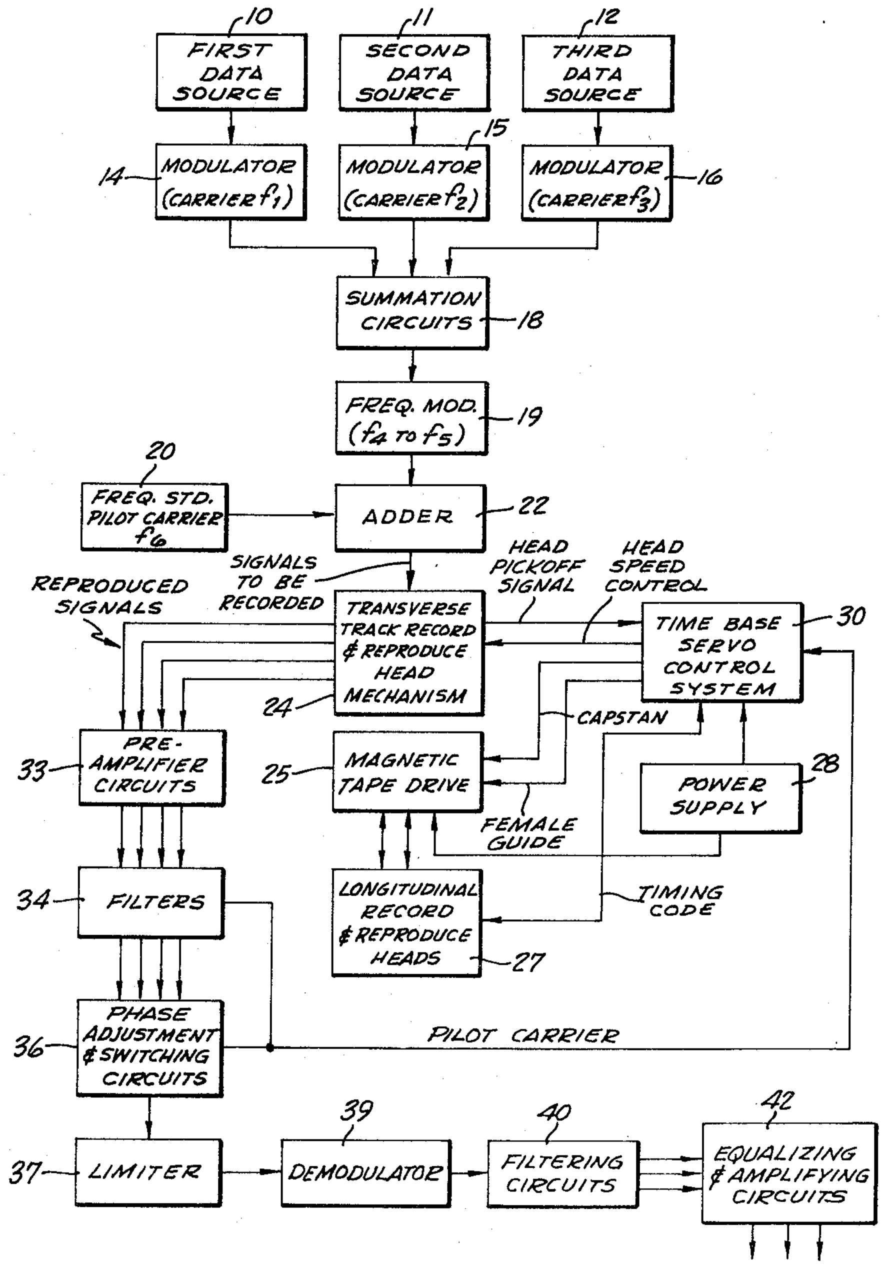
FIG. 1 is a block diagram of a recording and reproducing magnetic tape system in accordance with the present invention.

The general arrangement of a combined recording and reproducing system in accordance with the invention may be arranged as shown in FIG. 1. A single system having both record and reproduce functions is shown, although the more detailed examples given below illustrate the manner in which the functions may advantageously be performed separately.

Thet exemplification of FIG. 1 performs an instrumentation function by deriving high information rate signals from first through third data sources 10 through 12, respectively, and recording these for separate and continuous reproduction. Because of the bandwidth capacity of the system, it may operate in the same manner to record television or other signals, although these will be processed differently before and after recording.

Usually, in instrumentation applications, the information to be recorded will be presented in a number of different forms. The signal from the first data source 10, for example, may be high-speed telemetry information, for which FM/FM recording is widely employed. Signals from the second data source 11 may be pulse code modulated (hereinafter referred to as PCM), and the signals from the third data source 12 may be audio modulated. Many more sources may, of course, be employed, and the information rates of the signals from the different sources may vary from the relatively slow audio rate to a high bit rate in the PCM data. In accordance with the invention these different signals are combined in particularly advantageous fashion by modulation with a carrier so that they occupy different bands in a predetermined frequency spectrum. Thus, signals from the first data source 10 are modulated by a first carrier at a selected frequency $f_1$ by a modulator 14. A part of the frequency spectrum is therefore given over to the FM/FM signals, as determined by the band covered by the sidebands of the signals when amplitude modulated by the $f_1$ carrier. Appropriate conventional filters (not shown) may be employed to reject components out of the selected frequency band. In like manner, the PCM signals from the second data source 11 are used to amplitude modulate a carrier $f_2$ of a different frequency in a second modulator 15. The frequency band now occupied by the PCM information about the $f_2$ carrier frequency does not overlap the FM/FM information centered about the $f_1$ carrier frequency. In like manner, a third modulator 16 is used to modulate yet another different carrier $f_3$ with the audio signals from the third data source 12.

Signals from the three modulators 14, 15 and 16 are applied in parallel to summation circuits 18, in which they are additively combined. The combined signals occupy mutually exclusive portions of a given frequency spectrum which encompasses frequencies $f_1$ to $f_3$ and are then used in a modulator 19 to frequency modulate a carrier. The components derived from the summation circuits 18 are treated as analog signals that control the FM carrier, the center frequency of which effectively shifts the entire frequency spectrum to a different band from frequencies $f_4$ to $f_5$. Frequency modulation has a number of advantages for magnetic recording and reproduction. The recording heads may be operated continuously at their optimum recording level, and no biasing signal need be employed. Furthermore, the total number of octaves covered by the heads are reduced, so that the head design need not involve sacrificial compromises.

On reproduction of the recorded information, as will be described below, signal limiting may be employed to reduce errors caused by partial dropouts such as may result from inadequacies of the magnetic coating on the tape.

The actual signal to be recorded includes, in addition to the signal from the frequency modulator 19, a closely controlled frequency standard, or pilot carrier, from a stable oscillator source 20. This may be a crystal controlled oscillator, for example, having a frequency stability equal to or in excess of one part in $10^7$. The frequency $f_6$ of the pilot carrier is selected to be outside the frequency band $f_4$ to $f_5$, and is most conveniently below $f_4$. On the combination of these signals in an adder 22, with subsequent filtering if desired, the signals to be recorded are applied to a wide band recording and reproduction system of the type which utilizes transverse track scanning, for example.

For convenience, the head mechanism 24, including the multihead scanning drum and the associated pulse pickoff mechanism which relates the head position to the tape, are shown separate from the magnetic tape drive system 25, including the reels, capstan and female guide mechanism which will be recognized as conventional parts of these systems. Longitudinal record and reproduce heads 27 may additionally be employed for recording a separate audio signal and also for recording a timing code signal in response to the head pickoff signals. A power supply 28 is coupled to the magnetic tape drive system 25 and to a time base servo control system 30 for the various servo controlled elements in the device.

While the operation of wide band recording and reproducing systems which utilize transverse track scanning is so well known that it need not be described in detail, a brief description of the various servo control features is provided here for convenience. As the successive heads on the scanning drum scan transversely across the tape, the timing code signals are generated, usually magnetically or photo-electrically, to provide the head pickoff signals which represent the actual relation of the head to the tape during recording. The timing code signals are then recorded on a longitudinal track on the tape. Concurrently, the pilot carrier is recorded along with the data in the transverse tracks. Subsequently, on reproduction, the timing code signals from the longitudinal track are fed back to the time base servo control system 30 and compared with head pickoff signals derived from scanning drum rotation to provide an error correction signal to control the scanning rate. The pilot carrier is here used as the reference for coarse and fine adjustments by which excellent time base stability is maintained. Separate circuits within the time base servo control system 30 provide signals for adjustment of the speed of the capstan and the position of the female guide as a result of the comparison of the reproduced pilot carrier with a separately generated frequency reference.

In reproduction of the data signals, separate signals are derived from each of the four separate heads and applied through separate preamplifier circuits 33 to different ones of a group of filters 34. Band selective elements within the filters 34 select only the pilot carrier, this signal being returned to the time base servo control system 30 and also employed for frequency and phase control in the phase adjustment and switching circuits 36. The circuits 36 finally recombine the signals from the separate heads to the form in which they were recorded. After passage through an associated limiter 37, the signals are reconverted in a demodulator 39 to amplitude signals having center frequencies $f_1$, $f_2$ and $f_3$ and passed through filtering circuits 40 which again separate the three information signal bands. These signals are provided as output data signals from the equalizing and amplifying circuits 42.

Figure 2:
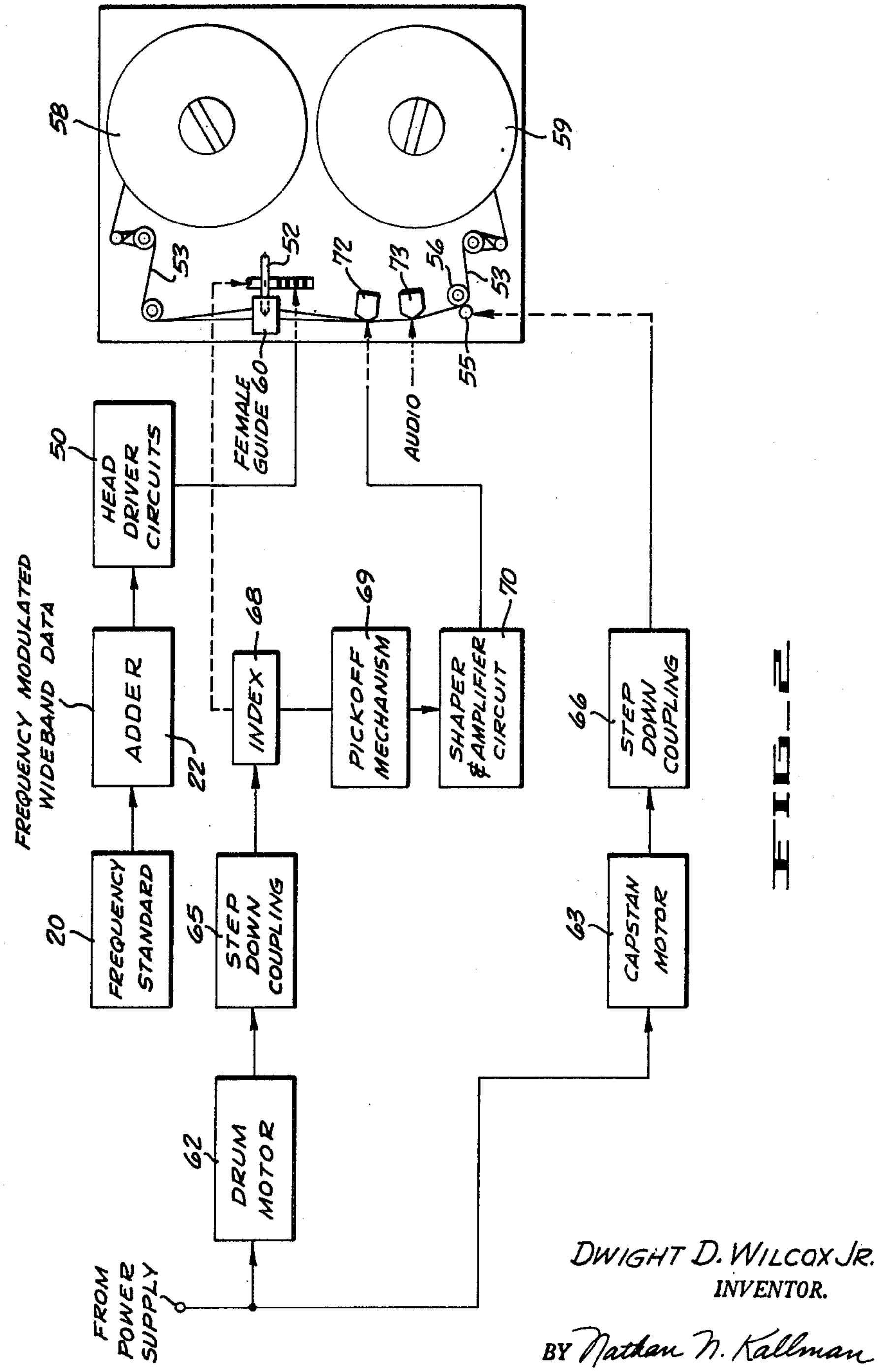
FIG. 2 is a detailed block diagram and schematic representation of a recorder system in accordance with the invention.
Figure 3:
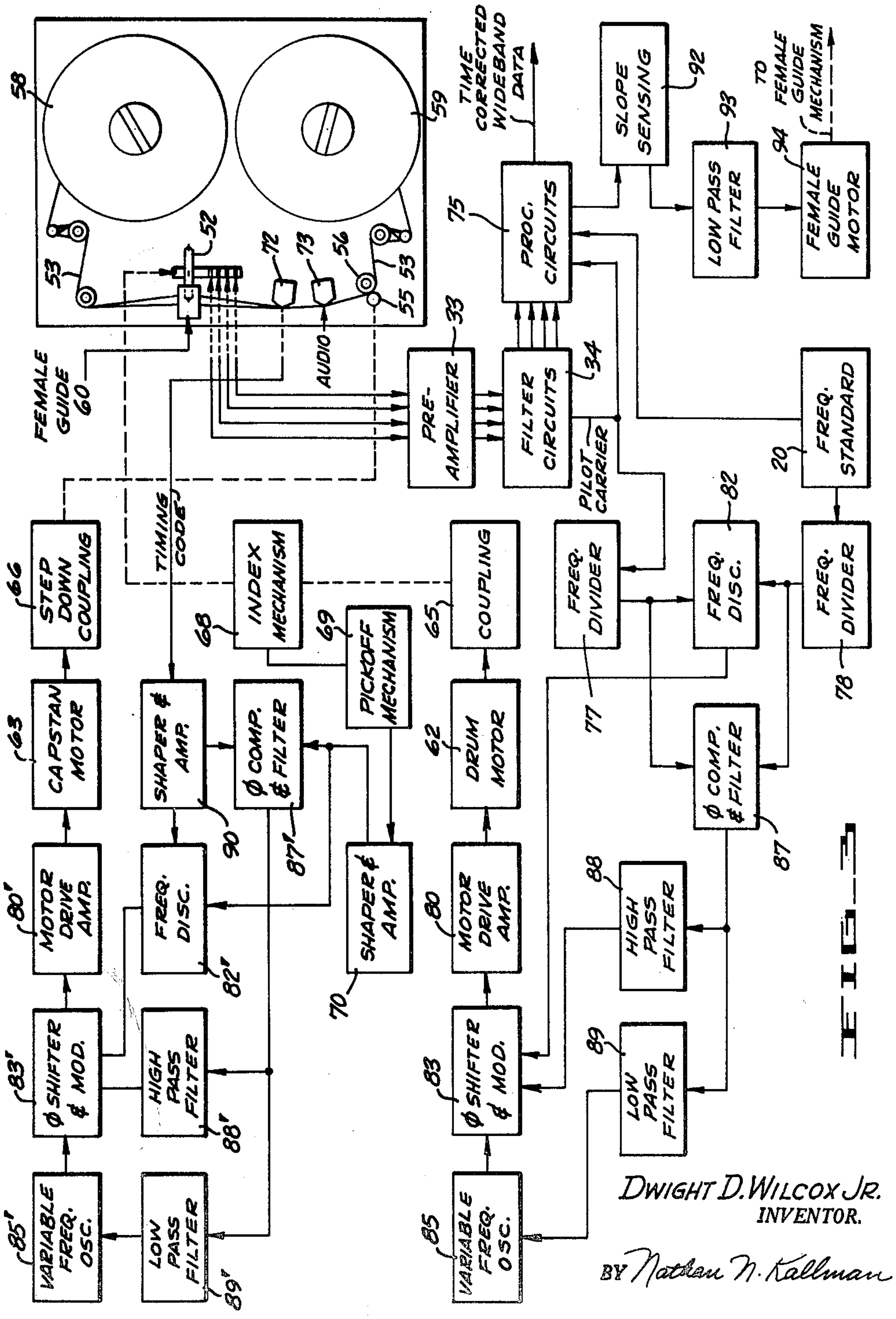
FIG. 3 is a detailed block diagram and schematic representation of a magnetic tape reproducing system in accordance with the invention.

Elements of the system of FIG. 1 are shown in greater detail in FIGS. 2 and 3. These figures show separately the units which perform the record and reproduce functions, although many elements are common to both recording and reproducing. In FIG. 2 the combined signal containing the frequency modulated wide band data and the pilot carrier is provided from the adder 22 to the head driver circuits 50 coupled to the heads (not shown in detail) on the scanning drum 52. The scanning drum 52 causes the heads (four of which are employed here) to pass transversely across the tape 53 at a high rate of speed as the tape 53 is moved relatively slowly in the longitudinal direction under the control of a drive capstan 55, which engages a pinch roller 56. The rate of rotation of the scanning drum and the longitudinal speed of the tape are selected in accordance with the bandwidth of the signals, which are to be recorded. To cover a 4 megacycle band, for example, the drum 52 may be rotated at 12,000 r.p.m. and tape 53 advanced by the capstan 55 at 12½ inches per second. To cover a 1 megacycle band, the speeds may be reduced to 3,000 r.p.m. and 3⅛ inches per second respectively in a typical example. A relatively wide tape 53 (e.g. 2″) is provided from a supply reel 58 and collected on a takeup reel 59, the drives and associated mechanisms for the reels 58, 59 and the tape 53 being conventional and illustrated only generally. In the region in which the tape 53 passes adjacent the drum 52, the tape 53 is cupped to conform to the circumference of the drum 52 by a female guide mechanism 60 which also maintains the tape 53 in precise alignment relative to the drum 52.

The drive mechanism for the scanning drum 52 and the capstan 55 includes a drum motor 62 and a capstan motor 63 respectveily, energized by signals from a power supply (not shown in FIG. 2). A stepdown coupling 65 between the drum motor 62 and the scanning drum 52, which may be a belt or other form of selected ratio drive, rotates the scanning drum 52 at the selected nominal rate of rotation. In like manner, a stepdown coupling 66 from the capstan motor 63 drives the capstan 55 at a selected nominal rate. The variations in speed of the rotating elements 52, 55 which inevitably result from variations in the signal from the power supply and in slippage of the drives and the like are not precisely regulated during the recording mode of operation. Instead, an index mechanism 68 which is coupled to and precisely aligned with the scanning drum 52 is used as a reference for a timing code signal. Although other timing signal generators may be used, the index mechanism 68 usually consists of a magnetic pickoff mechanism 69, which generates signals in synchronism with the rotation of the scanning drum 52 during recording. These signal variations, after processing in suitable shaping and amplifying circuits 70, are applied to a control track head 72 and recorded as a longitudinal timing code pattern along one edge of the tape 53. Another head 73, positioned along the opposite edge of the tape 53, provides another channel for audio or other information. Erase heads and other features normally incident to the recording process which may be employed have not been shown in detail in order to simplify the drawing.

Systems in accordance with the invention have advantages whether the recorder elements shown in FIG. 2 are employed separately or as part of a combined recorder/reproducer unit. When used separately, the system is light, compact, and requires relatively little power. Further, and this is of great significance to wideband systems, the recorded data may be reproduced with a high order of time base stability on any reproducing system further arranged in accordance with the invention. Such a reproducing system, with like elements being designated as in FIG. 2, is shown in FIG. 3.

In the reproduction of the signals, each of the heads on the scanning drum 52 is coupled through a suitable rotary contact arrangement (not shown in detail) and a preamplifier circuit 33 to the filter circuits 34 that extract the pilot carrier and provide the data signals to the associated processing circuits 75, which are discussed in detail elsewhere. A number of different servo control loops are employed, each of which cumulatively contributes to the achievement of the highly stable time base.

The control loop for the scanning head 52 includes three nested loops which together constitute a phase locked servo. The pilot carrier, which is derived from the reproduced signals, contains error information while the reference signal is derived from the frequency standard 20. The frequency standard 20 may be a separate stable oscillator, or, as shown below, a variable frequency device arranged in a particular way. The signals are reduced to lower frequencies in coupled frequency divider circuits 77, 78, respectively, although existing frequency and phase differentials between the signals are maintained. Each of the three nested loops contributes in a particular way to control the synchronous drum motor 62, which is energized by a motor drive amplifier 80. A velocity feedback signal for improved damping of the drum motor 62 rotation is derived from one loop, this loop including a frequency discriminator 82 coupled to receive the error and reference signals from the frequency divider circuits 77, 78. The signal from the frequency discriminator 82 is applied to a phase shifter and modulator circuit 83, which is responsive to signals from a variable frequency oscillator 85. As the drum motor 62 speed changes to minimize the error, the frequency error control signal from the discriminator 82 diminishes so as to limit overshoot in the speed correction.

The reproduced pilot signal and the reference signal are also applied to phase comparator and filter circuits 87, which generate error signals for the two remaining control loops. In one of the control loops, the high-pass filter 88 passes the rapidly varying components in the phase error signal to the control input of the phase shifter and modulator circuit 83. Adjustments in the phase shifter output signal alter the drum motor 62 speed accordingly. The relatively slow varying components from the phase comparator and filter 87 are derived through a low-pass filter 89, and utilized to control the frequency of the variable frequency oscillator 85. The outer control loop which includes the low-pass filter 89 integrates the phase difference to ensure that no steady state phase error is needed. An extremely small phase error, which depends upon the gain of the outer loop, is sustained so as to operate the loop over the expected range of variations. This error is so small, however, that deviations introduced thereby into the reproduced data are readily eliminated by the subsequent operation of the processing circuit 75. This overall servo mechanism is capable of maintaining time base errors in the reproduced data within ±0.25 microsecond.

A portion of the circuit arrangements just described is shown and described in U.S. Patent No. 3,017,462 assigned to the assignee of the present invention. Reference may be made to this patent for a fuller understanding of various operative features.

The servo system for controlling the capstan motor 63 which derives the capstan 55 utilizes the timing code signals from the control track head 72, and the signals from the pickoff mechanism 69. Cyclic waveforms are generated by the shaper and amplifier circuit 70 which are coupled to the pickof mechanism 60, and by similar shaper and amplifier circuits 90 which are coupled to the control track head 72. These circuits are otherwise the same as for the scanning drum servo, with appropriate adjustments in timing constants. Thus the signals from the shaper and amplifier circuits 70, 90 are applied to both phase comparator and filter circuits 87′ and a frequency discriminator circuit 82′. Velocity feedback signals are applied to the phase shifter and modulator circuit 83′ in response to the signals from the frequency discriminator 82′. Precise adjustment of the capstan motor 63 speed is made by the signals in the intermediate loop which are passed to the phase shifter 83′ from the high-pass filter 88′, and control of the variable frequency oscillator 85′ is effected by the low-pass filter circuit 89′. In effect, as is also described in the above mentioned Patent 3,017,462 the capstan 55 speed is adjusted to the corrected rotation of the drum 52.

The final servo control used in this arrangement controls the position of the female guide 60 relative to the scanning drum 52. Because magnetic tape is not a dimensionally stable medium, and is particularly subject to permanent shrinkage following heating, changes may appear in the rate of data readout if compensation is not made for these modified physical characteristics. To this end, the female guide 60 adjusts for the transverse dimension of the tape 53 by changing the manner in which the tape is stretched over the drum 52. A phase comparison is made in the processing circuit 75 between the reproduced pilot signal and the reference signal, and this phase error signal is applied to a slope sensing circuit 92. The slow varying component of the signal from the slope sensing circuit 92 is derived by a low-pass filter 93 and applied to the female guide motor 94. This arrangement is widely employed in transverse track scanning recording and reproducing systems and accordingly need not be described in greater detail.

Figure 4:
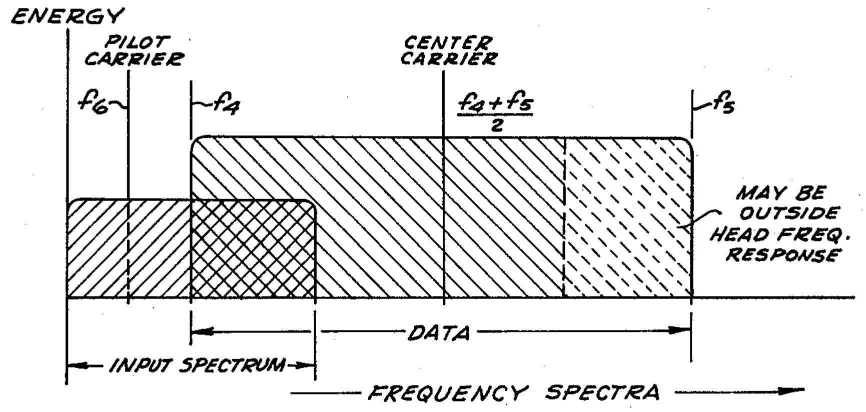
FIG. 4 is a diagram of energy content versus frequency representing the frequency spectrum of data and pilot carrier signals as employed in systems described herein.

A generalized representation of the frequency spectrum of the recorded signals is provided in FIG. 4. As shown therein, the data occupies a frequency spectrum from $f_4$ to $f_5$, about a center carrier frequency which is midway between these two limits. The pilot carrier is at a frequency, $f_6$, which is outside the data band. Within the data band, the different input signals occupy mutually exclusive segments of the spectrum. Both sidebands about the center frequency are not needed, of course, and in fact one of the full sidebands is not usually retained through the recording and reproduction. With a center carrier of 6 mc., for example, and wideband data 4 mc. wide, the frequency modulated spectrum will extend from 2 to 10 mc. It is not necessary for the reproducing heads to cover this entire range because with frequency modulated signals they may be designed to cover from only 2 to, for example 7.5 mc. The frequencies above 7.5 mc. are lost during recording, but the information content is still fully present in the other sideband. When the reproduced signals are passed through the limiter thereafter, the upper frequency components are restored.

Figure 5:
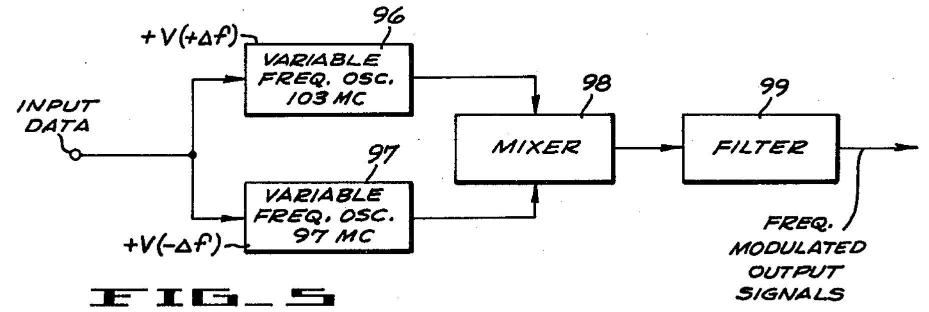
FIG. 5 is a block diagram of an example of a modulator circuit which may be employed in accordance with the invention in the systems of FIGS. 2 and 3.

A particularly useful frequency modulator circuit 19 (FIG. 1) for providing the spectral distribution shown in FIG. 4 is given in block diagram form in FIG. 5. The input data signals, which are utilized as analog signals, control a pair of variable frequency oscillators 96, 97 which have selected spaced apart center frequencies. It has been found particularly advantageous to frequency modulate oscillator circuits using voltage variable capacitors. Such circuits have excellent sensitivity and range, and the push-pull driving coupling components for nonlinearities in the characteristic curves of the voltage variable capacitors. For a center carrier frequency of 6 mc., nominal center frequencies for the oscillators 96, 97 of 103 and 97 mc. have been chosen. The frequency modulated output signals from the oscillators 96, 97 are heterodyned in a mixer 98, and following elimination of undesired harmonics in filter circuits 99, signals having the spectrum shown in FIG. 4 are derived. Because changes in temperature cause the heterodyned signals to change frequency in the same direction, the output carrier frequency shifts very little with temperature. The unwanted frequencies coherent with the input wave which are generated by this system are kept at a level below the white noise generated within the system.

Figure 6:
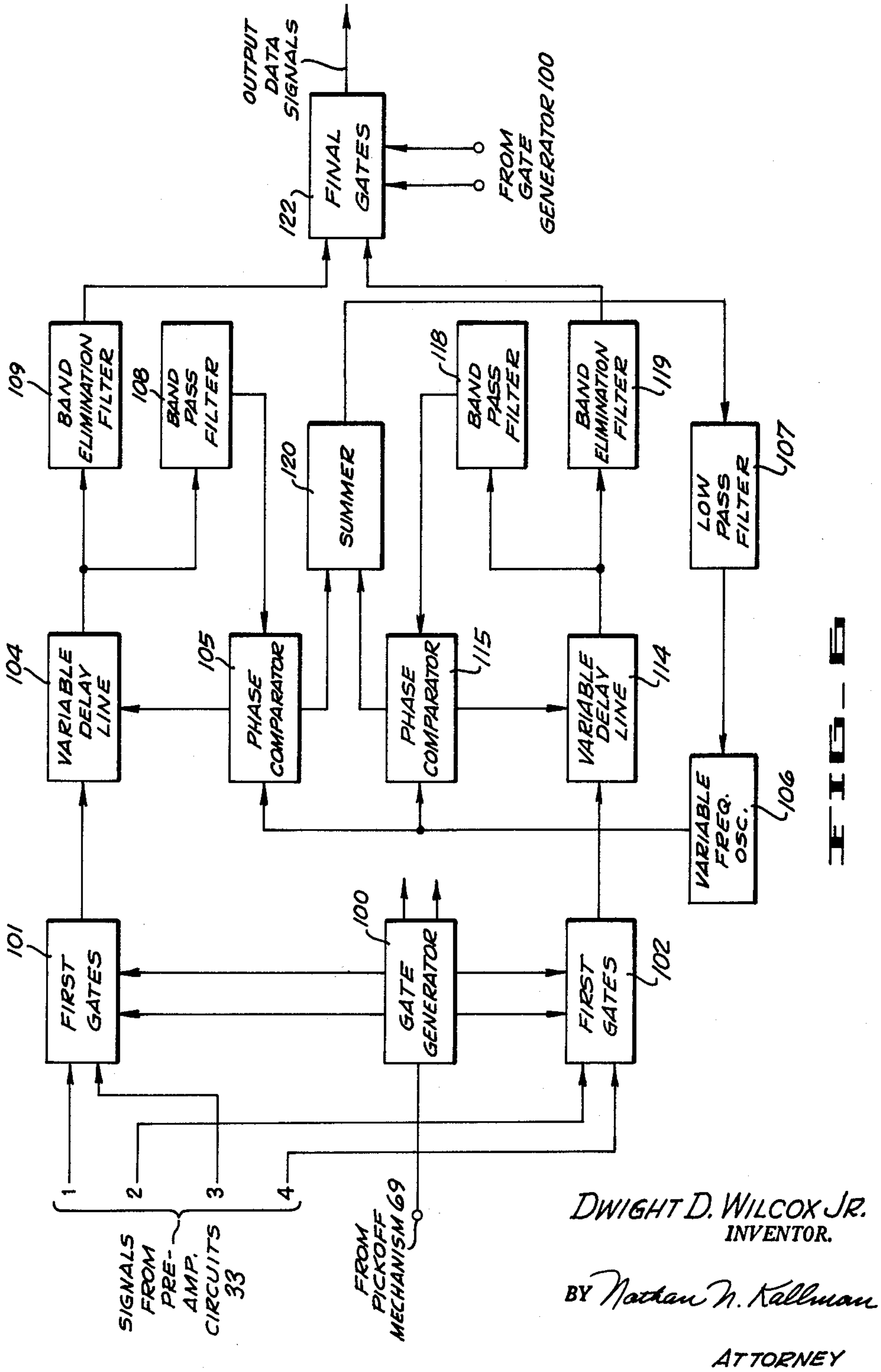
FIG. 6 is a block diagram representation of a servo controlled fine timing adjustment and switching system for magnetic tape systems in accordance with the present invention.

Referring now to FIGS. 1 and 6, there are shown preferred phase adjustment and switching circuits 36. Reproduced data signals, including the pilot carrier, are provided from four separate preamplifier circuits 33 of FIG-1 as the head pickoff signals are supplied from the servo control system 30 of FIG. 1. The system shown in FIG-6 is essentially like that of FIG. 1, but the reference signal is derived from a variable frequency oscillator and the band-pass filters for selecting the pilot carrier are shown separately.

The head pickoff signals actuate a gate generator 100, which generates a number of different output signals which are directly useful as timing signals. These timing signals represent the actual speed of rotation, and the position at any instant, of the heads on the scanning drum. With four heads on the drum, the gate generator 100 provides eight different square waves 45° in phase apart, having the same frequency as the rotational speed of the drum.

With four separate heads of the scanning drum, displaced 90° from each other, any two adjacent heads will be in contact with the tape and reproducing signals concurrently at some intervals during the complete cycle. The oppositely disposed heads, pairs 1 and 3 and 2 and 4, do not at any point in the cycle reproduce signals during the same instant. This fact is made use of at first gate circuits 101, 102 respectively, which are each coupled to receive signals from a different opposed pair of heads. Under control of the appropriate gate signals, therefore, each of the gates 101, 102 is activated during the 90° segment of rotation of the scanning drum in which one of the pair of coupled heads is in contact with the tape, then deactivated for the next 90° segment, reactivated for the further 90° segment, and so on. The reproduced signals are thus divided into two separate signal channels in which the final time base adjustment is made.

The phase adjustment of the reproduced signals is made prior to final recombination of the signals in the two channels. Considering the circuit which receives signals from the gate 101 which are coupled to the first and third heads, a controlled and precise delay is introduced by an electronically variable delay line 104 under the control of a phase comparator 105. The variable delay line 104 (described in greater detail hereinafter) may utilize voltage variable capacitors for electronic variation of the time constants of the delay line elements. The phase comparator 105 receives reference signals from a variable frequency oscillator circuit 106 which is relatively slowly adjusted by low frequency components accepted by a low-pass filter 107 from the system.

The pilot carrier passed through the variable delay line 104 is extracted by a bandpass filter 108 and applied to the phase comparator 105 for reference against the variable frequency oscillator 106. The phase comparator 105 generates an error signal to control the delay introduced by the variable delay line 104. Because this represents the final time correction in a series of cumulative corrections, the adjustment is very small, being of the order of tenths of a microsecond at a maximum. Therefore the signal accepted by the bandpass filter remains very close to the nominal pilot carrier frequency. For this reason the very slow varying component, or long term drift in the error signal may be used to control the variable frequency oscillator 106 in the manner shown, to tend to maintain a constant phase difference between the reproduced pilot carrier and the frequency standard. The constant phase difference used is selected to maintain the variable delay line 104 in the center of its operating region.

The pass band of the filter 108 must be wide enough to encompass the normal range of variations in the reproduced pilot carrier. This may be accomplished by having a relatively gradual increase in attenuation for frequencies outside the nominal frequency value.

The data signals from the second and fourth heads are in like manner adjusted in phase in a variable delay line 114 operating under control of a phase comparator 115 which receives the reference signals from the variable frequency oscillator 106 and the pilot carrier from the bandpass filter 118. The pilot carrier signals are attenuated in both signal channels by band elimination filters 109 and 119 respectively and are applied together to second and final gating circuits 122 which operate under control of the gate generator 100. These gating circuits 122 employ what may be termed a "slow switching" technique, in accordance with the teachings of U.S. Patent No. 3,152,226 assigned to the assignee of the present invention. As described therein, the transients due to high speed switching are completely eliminated from the final output signal by a gradual blending of one signal in as the other signal is gradually diminished. Where a slight phase difference exists between the signals, a slight dip may appear in the amplitude of the combined signals, but this dip is in any event eliminated by subsequent limiter circuits with frequency modulated data.

The slow varying components in the error signals from the phase comparators 105, 115 are additively combined in a summer circuit 120 and returned to control variable frequency oscillator 106 through the very low-pass filter 107 as above described. As discussed above in conjunction with the arrangement of FIG. 3, the signal derived from the summer circuit 120 may also be applied to circuitry used for controlling the female guide mechanism.

Certain advantages derived from the use of the arrangement of FIG. 6 should be noted. First, the various timing relationships are all referenced to the highly reliable and stable pilot carrier. There is therefore freedom from long term drift, and the advantage that the time base is under continuous control. Furthermore, there is a material saving in the amount and complexity of the circuits required, and a decrease in cost as well as a betterment of reliability. Most importantly, in addition to time base stability there is also continuous data reproduction. It will be evident that the various circuits which might be used for phase adjustment, gain control and signal shaping in the arrangement of FIG. 6 have not been shown for purposes of simplicity.

Figure 7:
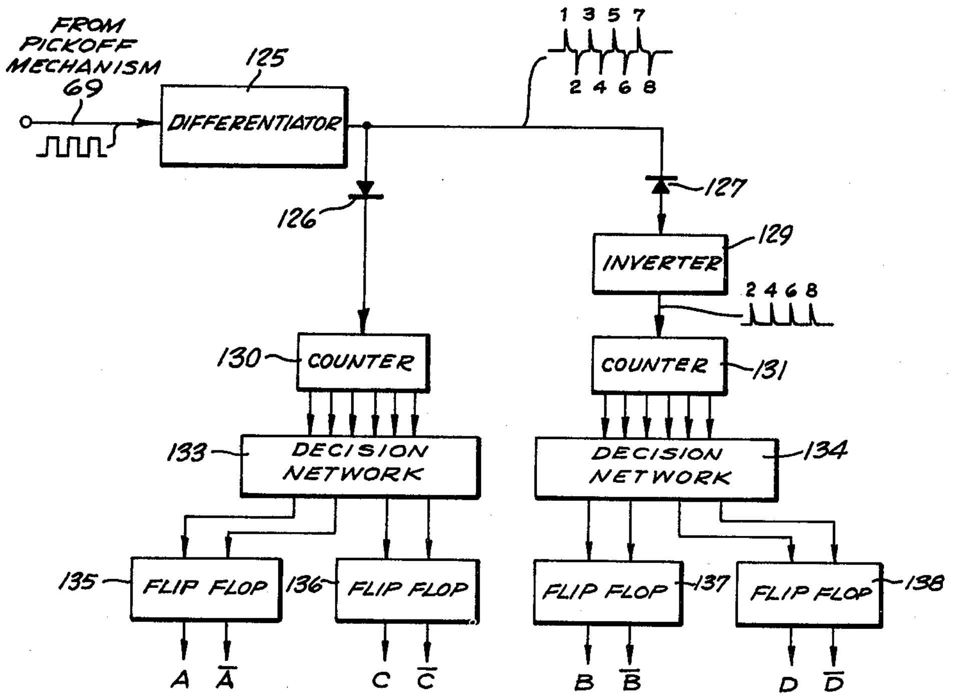
FIG. 7 is a block diagram representation of a gate signal generator circuit which may be employed in the systems of FIGS. 2 and 3.

A form of gate generator 100 which provides the timing pulses need for control of the gates 101, 102 and 122 in the arrangement of FIG. 6 is shown in FIG. 7. The system switching action requires eight equally spaced timing signals during each revolution of the scanning drum. These timing signals are generated in response to the pickoff signals from the reference mechanism 69 associated with the scanning drum 52. To this end, the rotary reference mechanism may be divided by eight radii into equal segments, alternately conductive and nonconductive of magnetic flux. Signals from the pickup device therefore are at four times the frequency of the scanning drum, and synchronized therewith. These signals are converted by the gate generator 100 into eight separate signals, each at the frequency of the scanning drum, but successively displaced from each other by 45° relative to the drum rotation.

The input signals for the gate generator 100 are those derived from the pickoff mechanism 69, and are of generally square wave form. The square waves are passed through a differentiating circuit 125 to provide alternately positive-going and negative-going voltage spikes, which are then applied in parallel to a pair of oppositely poled unilateral conducting devices 126, 127. After inversion of the negative pulses in an appropriate inverter circuit 129, each of the separate series of pulses is applied to a counter 130, 131, respectively. The counters 130, 131 are recirculating devices having three binary stages each, and each controls a different decision network 133, 134 respectively, the networks 133, 134 being diode matrices or other elements arranged to perform logical gating functions. Each of the decision networks 133, 134 controls a different associated pair of flip-flops 135, 136 or 137, 138 respectively.

Briefly, this mechanism operates as follows. The positive pulses and the negative pulses which are derived from the differentiating circuit 125 are spaced 45° apart from each other, relative to the rotation of the scanning drum. There are eight pulses per cycle, therefore, with the first, third, fifth and seventh being positive (in this example) and the remaining pulses being negative. To provide a first square wave at the scanning drum frequency and referenced to a first pulse of the scanning drum cycle, the first pulse of the series is used to set the first flip-flop 135 and the fifth pulse is used to reset the flip-flop, following which it is again set by the first pulse of the next series. This therefore provides the first square wave, with the set output terminal going "high" at the start of the cycle and low at the 180° point. This may be called the A output signal. A signal which is 180° out of phase with the A signal, and which may be called an $\overline{A}$ signal, is concurrently derived from the reset output of the first flip-flop 135. The set and reset functions of the first flip-flop 135 are directed by the decision network 133 under control of the three stage counter 130 in conventional fashion.

In like manner, but with a 45° phase delay from the first described square wave, a square wave is provided at the set output terminal of the third flip-flop 137, beginning with the second pulse of the series and terminating with the sixth pulse of the series (both negative pulses). These pulses are independently selected by the other decision network 134 under control of the counter 131. The signals on the two output terminals of the third flip-flop 137 may be called the B and $\overline{B}$ signals respectively. The output signals provided by the second and fourth flip-flops 136 and 138 respectively are similarly controlled to provide the desired time relationships in the square waves which they provide at the scanning drum frequency.

Figure 8:
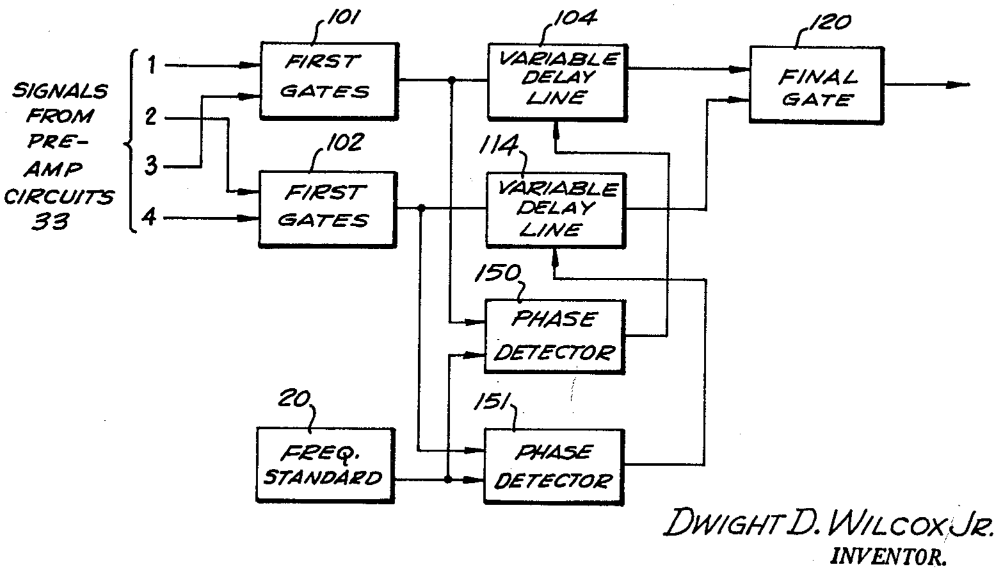
FIG. 8 is a block diagram representation of an alternate form of timing adjustment and switching system.

As another alternative arrangement in accordance with the invention, it is also feasible to employ an open loop servo arrangement for the phase adjustment and switching circuits 36 of FIG. 1. One such arrangement is shown in FIG. 8, in which supplementary details discussed at length in conjunction with FIG. 6 have been omitted for simplicity. As in FIG. 6, a preliminary switching is made in first gates 101, 102 to couple together the oppositely disposed heads on the scanning drum during intervals in which no transients can be introduced into the system. Variable delay lines 104, 114 then adjust the phase of the signals provided from the switches 101, 102, and there is a final combination of these signals in the two channels in the final gates 120, preferably using the slow switching technique above mentioned. The open loop control for this arrangement utilizes the frequency standard 20 and a pair of phase detectors 150, 151. As is conventional with open loop arrangements, the error signals derived from the phase detectors 150, 151 are proportional to the difference between the standard and the reproduced signals, and control the variable delay lines 104, 114 so as to introduce a compensating delay calculated to eliminate the error.

Figure 9:
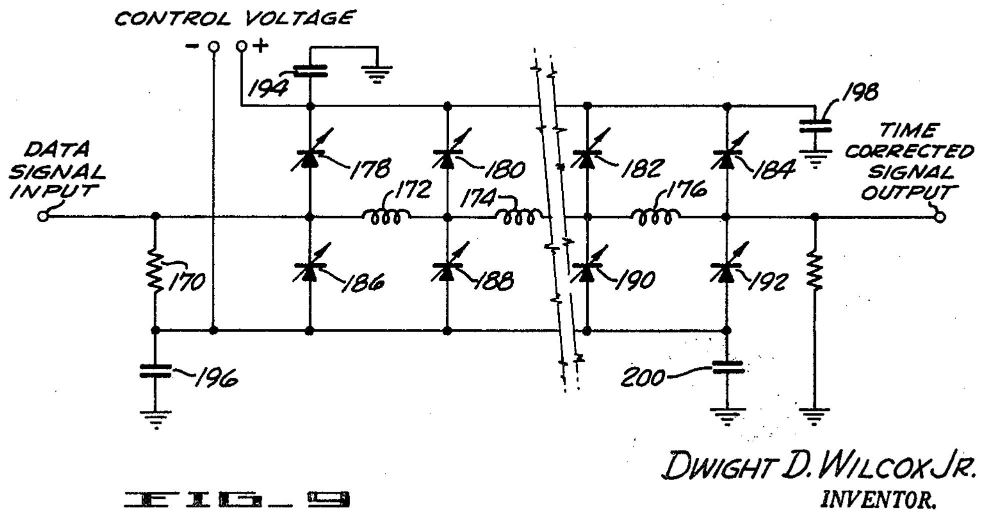
FIG. 9 is a schematic circuit diagram of an electronically variable delay line, such as used with the inventive system.

In FIGURE 9, one embodiment of an electronically variable delay line 104, 114 is shown wherein a plurality of voltage variable capacitors (Varicaps) or silicon junction capacitors are coupled in a balanced configuration forming a lumped parameter line. The capacitances of the Varicaps are changed in accordance with a control voltage that may be applied thereto in push-pull. In operation, the data signal that is being processed is derived from the first gates 101, 102 and applied through a termination resistor or resistive load 170 to a bus carrying a series of inductances 172, 174, 176. Each inductance is coupled between two pairs of Varicaps, each pair comprising a balanced configuration wherein the anode of the first Varicap 178, 180, 182, 184 is coupled to the cathode of the second Varicap 186, 188, 190, 192. Thus, the information signal is passed through the delay line to provide a signal output having a fixed delay relative to the input signal. However, whenever an error signal is applied from the phase comparator 105, 115 in FIGURE 6 or the phase detectors 150, 151 in FIGURE 8 to the variable delay line 104, 114, the fixed delay is varied in accordance with the error control voltage. The error voltage is approximately proportional to the fourth power of the change in the fixed delay. Any increase in the error voltage decreases the lumped capacitances and the extent of delay. Such error control voltage may be applied in push-pull to the cathodes of the Varicaps 178–184 and to the anodes of the Varicaps 186–192. Bypass capacitors 194–200 are coupled between the Varicap network and a reference potential such as ground.

The number of balanced sections of Varicaps and inductors serves to determine the magnitude of the fixed delay, and an increased number increases such fixed delay and also affords a greater variation in the range of such adjusted delay. By virtue of the balanced system, the opposing Varicaps in each pair act to cancel the effects of any voltage change that may be caused by the information signal alone. Only the error control voltages derived from the phase comparators 105, 115 or detectors 150, 151 cause a change in the delay of the signal output.

While there have been described above and illustrated in the drawings various forms of wideband recording and reproducing systems utilizing transverse track scanning, it will be appreciated that the invention is not limited thereto but may include other types of systems such as the helical drive tape apparatus. Accordingly, the invention should be considered to include all modifications, variations and alternative forms falling within the scope of the appended claims.

What is claimed is:

1. A magnetic tape signal reproducing system for providing essentially continuous reproduction of wideband instrumentation data with precise time base stability, the tape including a recorded transverse track signal containing a pilot signal and a separate timing code pattern, the system including the combination of: means for reproducing the timing code pattern; reproducing means moving at a controllable speed for reproducing the data from the recorded signal in successive signal channels; first servo means responsive to the reproduced timing code pattern for adjusting the speed of the reproducing means; at least two electronically variable delay elements coupled in the signal channels; second servo means responsive to the pilot signal in the reproduced data for controlling the variable delay elements in accordance therewith; and switching means coupled to receive signals from the variable delay elements for finally combining the reproduced signals into a single continuous channel.

2. A magnetic tape signal reproducing system for providing essentially continuous signal reproduction from a tape including a recorded transverse track signal containing a pilot carrier signal and a separate timing code pattern, the system including: rotary head means for scanning the tape for reproducing the data in different signal channels; means responsive to the timing code pattern for controlling the speed of scanning of the tape; controllable electronically variable delay elements coupled in at least two of the signal channels for the reproduced data; means responsive to variations in the pilot signal in the reproduced data for controlling the variable delay elements; and means for receiving the signals from the variable delay elements for combining the reproduced signals to provide essentially continuous signals in a single channel.

3. A magnetic tape signal reproducing system for providing essentially continuous signal reproduction of wideband instrumentation data with precise time stability from data recorded in transverse tracks on a tape and containing a pilot carrier signal, the tape also including a separate longitudinally recorded timing code pattern, the system including the combination of: rotating means including a number of reproducing heads for successively scanning the tape, the rotating means being controllable in speed; controllable means for moving the tape along a longitudinal path at a controlled speed; means disposed adjacent to the tape for reproducing the timing code pattern; first servo means responsive to the reproduced timing code pattern and the reproduced pilot signal for adjusting the speed of rotation of the rotating means and controlling the speed of the controllable means to effect a first timing control of the reproduced data; means coupled to the reproducing heads and the rotating means for combining signals therefrom into two signal channels; first and second electronically variable delay elements, each coupled to a different one of the signal channels; means for deriving the pilot signal from the reproduced data; second servo means responsive to the derived pilot signal for controlling the delay provided by the variable delay elements to effect a second timing control of the reproduced data; and final switching means coupled to receive the signals from each of the electronically variable delay elements, and operable at times controlled by the timing code pattern for combining the reproduced signals into a single signal channel.

4. In conjunction with a recording and reproducing system in which a number of rotary magnetic heads transversely scan a longitudinally moving magnetic tape and the successive signals from the different heads are recombined to provide a continuous signal, the recorded data signals including components of a pilot carrier signal at a selected frequency, the combination of: first signal combining means coupled to the head scanning mechanism for coupling together signals derived from differently positioned ones of the heads during intervals in which one head is reproducing signals and the other head is not reproducing signals to provide reproduced data signals having overlapping intervals in two separate signal channels; reference frequency source means providing a reference signal at the nominal frequency of the pilot signal; means coupled to each of the signal channels and responsive to the pilot signal components in the reproduced data signals for comparing the reproduced pilot signal to the reference signal to provide an error signal; electronically variable delay means coupled to each of the signal channels and responsive to each of the error signals from the signal channels to shift the phase relationship of the reproduced data signals to a predetermined precise relationship relative to the time base with which the data was recorded; and second signal combining means coupled to each of the electronically variable delay lines and synchronized to the scanning of the magnetic heads for recombining the signal from each of the signal channels into a single output signal channel, the recombination being effected over a selected interval such that there is a gradual decrease in the amplitude of one signal while there is a related gradual increase in the amplitude of the signal from the other channel.

5. A system for reproducing wideband data signals recorded in successive transverse tracks of a magnetic tape as frequency modulated signals occupying a selected frequency band and including a pilot carrier signal with a frequency outside the selected frequency band, the tape also including a longitudinal timing code track representative of timing variations incurred during recording, the system including the combination of: means for reproducing the timing code signals; a scanning drum having a number of heads positioned thereabout which successively scan the tape; means responsive to the reproduced timing code signals for controlling the speed at which the heads scan the tape to effect a first degree of control of the time base of the reproduced signal; means responsive to the rotation of the scanning drum during reproduction to provide timing pulses therefrom; a pair of first gates coupled to receive signals from the different ones of the heads, the first gates being controlled by the timing signals so as to couple different active heads to inactive heads such that two signal channels are established in which signals from different ones of the heads appear; means including a voltage variable delay line for effecting a second degree of adjustment of the time base of the reproduced signals in each of the channels, the second degree adjusting means including a phase comparator having one input terminal coupled to receive the reproduced pilot signals and having an output terminal coupled to control the variable delay line; reference frequency means coupled to provide a reference signal to the other input terminal of the phase comparator means; and second signal combining means coupled to receive signals from the variable delay lines and to be controlled by the timing signals and providing a continuous output signal.

6. In a magnetic tape reproducing system of the type which uses a transverse track scanning head drum having four separate heads which successively scan the tape substantially transversely as the tape is moved longitudinally, a transient free switching system for combining signals reproduced successively by the heads into a single continuous data signal, the data on the tape including a pilot carrier signal, a combination including: means responsive to the scanning drum rotation for providing gating signals in timed relationship thereto; a pair of first gates each coupled to an oppositely disposed pair of heads and combining the signals therefrom during reproduction by one head as the opposite head of the pair is inactive, under control of the gating signals; a variable frequency oscillator having a control input to which control signals may be applied to effect a relatively slow change in frequency; first and second phase adjustment signal channels, each coupled to receive signals from a different one of the first gates and each including a voltage variable delay line, the input terminal of the voltage variable delay line being coupled to receive signals from the associated first gate; the signal channel also including a bandpass filter coupled to the output terminal of the voltage variable delay line which is selected to extract the pilot signal therefrom; phase comparator means coupled to the variable frequency oscillator and to the bandpass filter for comparing the phase of the reproduced pilot signal to the signal from the variable frequency oscillator, the output signal from the phase comparator means being coupled to the control input of the voltage variable delay line; and band elimination filter means coupled to the output terminal of the voltage variable delay line for rejecting pilot signal components therein; the system also including a signal summation circuit coupled to receive and combine the error signals from the phase comparators; lowpass filter means coupling the signal summation circuit to the control input of the variable frequency oscillator, such that the slow varying components in the combined error signals from the signal summation circuit slowly shift the frequency of the variable frequency oscillator to control the amount of delay introduced by the voltage variable delay lines so as to tend to maintain a selected average delay in the voltage variable delay lines; and slow switching means comprising second gates controlled by the gating signals and coupled to receive the phase adjusted signals from the signal channels for combining the signals into a common output channel, the slow switching of the signals constituting a gradual blending effected over a predetermined interval of the signal contributions from each of the channels.

7. The system set forth in claim 6 above, wherein the slow switching to and from a given channel is effected in accordance with a trapezoidal waveform, and wherein the reproduced data is frequency modulated and the pilot signal is not frequency modulated; the system also including signal limiting means coupled to receive the reproduced frequency modulated wideband data.

8. In a magnetic tape signal reproducing system of the type which uses a transverse track magnetic head scanning drum having four separate heads which successively scan the tape substantially transversely as the tape is moved longitudinally, a transient free switching system for combining the signals reproduced successively by the heads into a single continuous data signal, the data on the tape including a pilot carrier signal at a selected frequency and the tape also including a longitudinal track having a timing code pattern, a combination including: means responsive to the scanning drum rotation for providing gating signals in timed relationship thereto; a pair of first gates each coupled to an oppositely disposed pair of heads and operable under control of the gating signals to combine the signals therefrom; means responsive to the timing code pattern and the reproduced pilot signal for controlling the speed of rotation of the scanning drum and the longitudinal speed of the tape to provide a first order of control of the speed of scanning of the recorded signals in accordance with the time base with which the signals were recorded; means providing a reference signal having a selected relationship to the frequency of the pilot signal; first and second phase adjustment means, each coupled to a different one of the first gates and each including a voltage variable delay line; a bandpass filter for extracting the pilot signal from the signals in the signal channel; phase comparator means coupled to receive the extracted pilot signal and the reference signal for controlling the amount of delay introduced by the variable delay line such that a second order of adjustment of the time base of the reproduced signals is provided; the system also including second gating means coupled to receive signals from both the signal channels and operable under control of the gating signals to effect a slow switching between the two channels, the slow switching being operative over a selected interval such that the amplitude of the contribution from one of the signal channels gradually diminishes while the amplitude of the signal from the other channel gradually increases relative to the scanning interval of each of the heads.

9. A magnetic tape signal reproducing system for providing essentially continuous signal reproduction of wideband recorded data with precise time stability, the data recorded in successive transverse tracks of the tape and containing a pilot signal and said tape including a separate longitudinally recorded timing code pattern, the system including the combination of:

rotating means including a number of reproducing heads for successively scanning the tape, the rotating means being controllable in speed;

controllable means for moving the tape along a longitudinal path at a controlled speed;

means disposed adjacent the tape for reproducing the timing code pattern;

first servo means responsive to the reproduced timing code pattern for controlling the speed of the controllable means;

means for deriving the pilot signal from the reproduced data;

second servo means responsive to the derived pilot signal for adjusting the speed of rotation of the rotating means, said first and second servo means cooperating to effect frequency control of the reproduced data;

means coupled to the reproducing heads in the rotating means for combining the signals therefrom into a number of signal channels;

a plurality of electronically variable delay elements, each coupled to a different one of the signal channels;

third servo means responsive to the derived pilot signal for controlling the delay provided by the variable delay elements to effect a phase control of the reproduced data; and switching means coupled to receive the signals from each of the electronically variable delay elements and operable at times controlled by the reproduced timing code pattern for combining the reproduced signals into a single signal channel.

References Cited by the Examiner

UNITED STATES PATENTS

| | | | |
|---|---|---|---|
| 2,245,286 | 6/41 | Marzocchi | 179—100.2 |
| 2,668,283 | 2/54 | Mullin | 178—6.6 |
| 2,828,478 | 3/58 | Johnson | 340—174.1 |
| 2,876,295 | 3/59 | Irby | 179—100.2 |
| 2,960,563 | 11/60 | Anderson | 178—6.6 |
| 3,005,056 | 10/61 | Goldmark et al. | 179—100.2 |
| 3,017,462 | 1/62 | Clark et al. | 178—6.6 |

IRVING L. SRAGOW, *Primary Examiner.*

BERNARD KONICK, *Examiner.*